(12) United States Patent
Esvelt et al.

(10) Patent No.: US 12,433,242 B2
(45) Date of Patent: Oct. 7, 2025

(54) DEVICES, SYSTEMS, AND METHODS FOR INTRODUCING ORGANISMS INTO POPULATIONS

(71) Applicant: Massachusetts Institute of Technology, Cambridge, MA (US)

(72) Inventors: Kevin M. Esvelt, Cambridge, MA (US); Sarah Anna Vitak, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 189 days.

(21) Appl. No.: 17/792,682

(22) PCT Filed: Jan. 13, 2021

(86) PCT No.: PCT/US2021/013197
§ 371 (c)(1),
(2) Date: Jul. 13, 2022

(87) PCT Pub. No.: WO2021/146254
PCT Pub. Date: Jul. 22, 2021

(65) Prior Publication Data
US 2023/0039625 A1    Feb. 9, 2023

Related U.S. Application Data

(60) Provisional application No. 62/961,020, filed on Jan. 14, 2020.

(51) Int. Cl.
*A01K 1/03* (2006.01)
*A01K 1/00* (2006.01)
(Continued)

(52) U.S. Cl.
CPC ............ *A01K 1/031* (2013.01); *A01K 1/0017* (2013.01); *A01K 21/00* (2013.01); *A01K 29/005* (2013.01)

(58) Field of Classification Search
CPC ...... A01K 1/031; A01K 1/0017; A01K 21/00; A01K 29/00; A01K 1/00; A01K 31/02
(Continued)

(56) References Cited

U.S. PATENT DOCUMENTS 8,020,519 B2 * 9/2011 Stamper ................ E05F 15/614
119/494
8,854,215 B1 * 10/2014 Ellis ........................ E06B 7/32
340/573.3
(Continued)

FOREIGN PATENT DOCUMENTS

WO    2017/196858 A1    11/2017

OTHER PUBLICATIONS

Berthier, Karine, et al. "Massive Nest-Box Supplementation Boosts Fecundity, Survival and Even Immigration without Altering Mating and Reproductive Behaviour in a Rapidly Recovered Bird Population." PLOS One, vol. 7, Issue 4, e36028, Apr. 2012, 7 pages.
(Continued)

*Primary Examiner* — Zoe Tam Tran
(74) *Attorney, Agent, or Firm* — Pierce Atwood LLP

(57) ABSTRACT

The invention relates, in part, to devices, systems and methods to increase the likelihood of survival and reproductive success of preselected organisms. An organism container may be configured for permitting access to a preselected organism and denying access to other organisms. The container may include a floor, one or more walls, a door, a lock associated with the door, and a first sensor configured to unlock the lock to selectively move the door into the open configuration when it detects the presence of the preselected organism at the door and outside of the organism enclosure so the preselected organism can enter the container cavity, and the first sensor is configured to prevent access to the container cavity to other organisms.

17 Claims, 4 Drawing Sheets

(51) Int. Cl.
  *A01K 21/00* (2006.01)
  *A01K 29/00* (2006.01)
(58) Field of Classification Search
  USPC .......................................................... 119/417
  See application file for complete search history.

(56) References Cited

U.S. PATENT DOCUMENTS

| | | | |
|---|---|---|---|
| 10,920,484 B2* | 2/2021 | Miller | E05F 15/611 |
| 11,035,166 B2* | 6/2021 | Demele | E05F 15/652 |
| 2005/0162279 A1* | 7/2005 | Marshall | A01K 11/008 |
| | | | 340/573.2 |
| 2010/0116219 A1 | 5/2010 | Noyes | |
| 2010/0282180 A1 | 11/2010 | Moffett-Chaney et al. | |
| 2012/0180731 A1 | 7/2012 | Garner et al. | |
| 2012/0266540 A1 | 10/2012 | Noyes | |
| 2018/0260645 A1 | 9/2018 | Roberson et al. | |
| 2019/0098874 A1 | 4/2019 | Burton | |
| 2020/0015740 A1* | 1/2020 | Alnofeli | A61B 5/4872 |
| 2020/0236909 A1* | 7/2020 | Kendall | A01K 39/01 |

OTHER PUBLICATIONS

International Search Report from corresponding International Patent Application No. PCT/US2021/013197 mailed from the International Searching Authority on Apr. 2, 2021.

Kallmyer, Nathaniel E. et al. "Nesting box imager: Contact-free, real-time measurement of activity, surface body temperature, and respiratory rate applied to hibernating mouse models." PLOS Biology, Jul. 24, 2019, 13 pages.

Written Opinion of The International Searching Authority from corresponding International Patent Application No. PCT/US2021/013197 mailed from the International Searching Authority on Apr. 2, 2021.

* cited by examiner

DEVICES, SYSTEMS, AND METHODS FOR INTRODUCING ORGANISMS INTO POPULATIONS

Related Applications

This application is a National Stage Filing under U.S.C. § 371 of PCT International Application PCT/US2021/013197 filed Jan. 13, 2021, and claims benefit under 35 U.S.C. § 119(e) of U.S. Provisional application Ser. No. 62/961,020 filed Jan. 14, 2020, the disclosure of which is incorporated by reference herein in its entirety.

FIELD OF THE INVENTION

The invention relates, in part, to devices, systems, and methods for increasing success of introducing organisms and/or heritable phenotypic and/or preselected heritable genotypic traits into organism populations.

BACKGROUND OF THE INVENTION

The introduction of an organism into a population of organisms of the same species is frequently unsuccessful. An introduced organism is at survival disadvantage and frequently fails to survive and/or reproduce. The low introduction success inhibits the ability to provide new organisms and heritable traits into a population of organisms.

SUMMARY OF THE INVENTION

In an aspect of the invention an organism container configured for permitting access to a preselected organism in provided, the organism container including: an organism enclosure which includes a floor, and one or more walls which together define a container cavity configured to hold one or more of the organism; a door configured for selective access of one or more of the preselected organisms into the container cavity, wherein the door has an open configuration configured to permit entry of one or more of the preselected organism into the container cavity, and a closed configuration configured to deny entry of other of the organisms into the container cavity; a lock associated with the door, wherein the lock is configured to keep the door in the closed configuration; and a first sensor associated with the organism enclosure, wherein the first sensor is configured to unlock the lock to selectively move the door into the open configuration when it detects the presence of the preselected organism at the door and outside of the organism enclosure so the preselected organism can enter the container cavity. In some embodiments, the first sensor includes a magnetic sensor. In certain embodiments, wherein the first sensor includes a radio-frequency identification (RFID) sensor. In some embodiments, wherein the lock includes a solenoid bolt lock. In some embodiments, the door is configured to pivot from the closed configuration to the open configuration. In some embodiments, the organism enclosure includes food and water for the preselected organism. In certain embodiments, the organism enclosure includes nesting materials for the preselected organism. In some embodiments, the organism container also includes a second sensor associated with the organism enclosure, wherein the second sensor is configured to unlock the lock to selectively move the door into the open configuration when it detects the presence of the preselected organism at the door and inside of the organism enclosure so that the preselected organism can exit the container cavity. In certain embodiments, the door is configured to move back into the closed configuration after the presence of the preselected organism at the door is not detected at the first sensor for at least approximately 5, 10, 15, 20, 25, or 30 seconds. In some embodiments, the door is configured to move back into the closed configuration after the presence of the preselected organism at the door is not detected at the second sensor for at least approximately 5, 10, 15, 20, 25, or 30 seconds. In some embodiments, the organism container is in combination with an identification element configured to be in or on the preselected organism, wherein the identification element is configured to interact with the first sensor to detect the presence of the preselected organism. In certain embodiments, the identification element includes a magnet. In some embodiments, the identification element includes an radio-frequency identification (RFID) element. In some embodiments, the organism container is in combination with an identification element configured to be in or on a preselected organism, wherein the identification element is configured to interact with the first sensor and the second sensor to detect the presence of the preselected organism. In some embodiments, the organism enclosure is sized and configured to receive a preselected organism. In certain embodiments, the preselected organism is a rodent. In some embodiments, the preselected organism is pregnant. In certain embodiments, the preselected organism is a female. In some embodiments, the preselected female organism is pregnant and the organism enclosure is sized and configured to receive the preselected organism and her offspring. In some embodiments, the organism enclosure further comprises a roof. In some embodiments, the preselected organism is a genetically engineered organism. In certain embodiments, the organism container is a nesting container. In some embodiments, a gestating offspring in the preselected pregnant female is an engineered organism. In some embodiments, the organism container also includes one or more of a remotely controlled element and a programmable element capable of opening or closing the organism container door independent of the presence of the identification element of the preselected organism. In certain embodiments, the organism container is configured for use by a preselected organism released from captivity into the wild. In some embodiments, the organism container is configured to be used by a preselected organism in captivity.

According to another aspect of the invention, a system configured for introducing a preselected organism into a habitat is provided, the system including: an organism container, the container including: an organism enclosure which includes a floor, and one or more walls which together define a container cavity configured to hold one or more of a preselected organism; a door configured for selective access of one or more of the organisms into the container cavity, wherein the door has an open configuration configured to permit entry of one or more organisms into the container cavity, and a closed configuration configured to deny entry of other organisms into the container cavity; a lock associated with the door, wherein the lock is configured to keep the door in the closed configuration; a first sensor associated with the organism enclosure, wherein the first sensor is configured to unlock the lock to selectively move the door into the open configuration when it detects the presence of the preselected organism at the door and outside of the organism enclosure so that the preselected organism can enter the nesting cavity; and an identification element configured to be in or on the preselected organism, wherein the identification element is configured to interact with the first sensor to detect the presence of the preselected organism. In some embodiments, the organism container also includes: a second sensor associated with the organism enclosure, wherein the second sensor is configured to unlock the lock to selectively move the door into the open configuration when it detects the presence of the preselected organism at the door and inside of the organism enclosure so that the preselected organism can exit the container cavity; and wherein the identification element is configured to interact with the second sensor to detect the presence of the preselected organism. In some embodiments, the first sensor is a magnetic sensor. In certain embodiments, the first sensor is an RFID sensor. In some embodiments, the lock includes a solenoid bolt lock. In some embodiments, the door is configured to pivot or swing from the closed configuration to the open configuration. In some embodiments, the organism enclosure includes food and water for the preselected organism. In certain embodiments, the organism enclosure includes nesting materials for the preselected organism. In some embodiments, the identification element comprises a magnet. In certain embodiments, the identification element comprises an RFID element recognized by the RFID sensor. In some embodiments, the organism enclosure is sized and configured to receive the preselected organism. In some embodiments, the preselected organism is a rodent. In some embodiments, the preselected organism is pregnant. In certain embodiments, the preselected organism is a female. In some embodiments, the preselected female organism is pregnant and the organism enclosure is sized and configured to receive the preselected organism and her offspring. In certain embodiments, the animal enclosure further includes a roof. In some embodiments, the preselected organism is a genetically engineered organism. In some embodiments, the organism container is a nesting container. In certain embodiments, a gestating offspring in the preselected pregnant female is an engineered organism. In some embodiments, the organism container also includes one or more of a remotely controlled element and a programmable element capable of opening or closing the organism container door independent of the presence of the identification element of the preselected organism. In some embodiments, the habitat is a wild habitat. In certain embodiments, the wild habitat includes a target population of organisms of the species of the preselected organism. In some embodiments, the habitat is a captive habitat. In some embodiments, the captive habitat includes one or more of a laboratory and a breeding facility.

In another aspect the invention includes, a method for introducing a preselected organism into a habitat, the method including: providing an organism enclosure which defines a container cavity configured to hold one or more of an organism, the organism enclosure having a door configured for selective access of one or more of the organisms into the container cavity, wherein the door has an open configuration configured to permit entry of one or more of a preselected organism into the container cavity, and a closed configuration configured to deny entry of other organisms into the container cavity; providing a first sensor associated with the organism enclosure; and moving the door into the open configuration when the first sensor detects the presence of the preselected organism at the door and outside of the organism enclosure so that the preselected organism can enter the container cavity. In certain embodiments, the method also includes moving the door into the closed configuration when the first sensor does not detect the presence of the preselected organism at the door, and locking the door in the closed configuration. In some embodiments, the method also includes providing a second sensor associated with the organism enclosure; and moving the door into the open configuration when the second sensor detects the presence of the preselected organism at the door and inside of the organism enclosure so the preselected organism can exit the container cavity. In some embodiments, the method also includes moving the door into the closed configuration when the second sensor does not detect the presence of the preselected organism at the door, and locking the door in the closed configuration. In some embodiments, the method also includes providing food and water in the organism enclosure for the preselected organism. In certain embodiments, the method also includes providing nesting materials in the organism enclosure for the preselected organism. In some embodiments, the door pivots from the closed configuration to the open configuration. In some embodiments, the method also includes providing a preselected organism with an identification element, wherein the identification element is in or on the preselected organism and is configured to interact with the first sensor to detect the presence of the preselected organism. In certain embodiments, the identification element comprises a magnet. In some embodiments, the identification element comprises an RFID. In some embodiments, the method also includes providing the preselected organism with an identification element, wherein the identification element is configured to interact with the first sensor and the second sensor to detect the presence of the preselected organism. In some embodiments, the preselected organism is an engineered organism. In certain embodiments, the preselected organism is a rodent. In some embodiments, the preselected organism is pregnant. In some embodiments, the preselected organism is a female. In certain embodiments, the preselected female organism is pregnant and the organism enclosure is sized and configured to receive the preselected organism and her offspring. In some embodiments, the organism container is a nesting container. In some embodiments, a gestating offspring in the preselected pregnant female is an engineered organism. In some embodiments, the organism container also includes one or more of a remotely controlled element and a programmable element capable of opening or closing the organism container door independent of the presence of the identification element of the preselected organism. In certain embodiments, the habitat is a wild habitat. In some embodiments, the wild habitat includes a target population of organisms of the species of the preselected organism. In certain embodiments, the habitat is a captive habitat. In some embodiments, the captive habitat includes one or more of a laboratory and a breeding facility.

DETAILED DESCRIPTION

Figure 1:
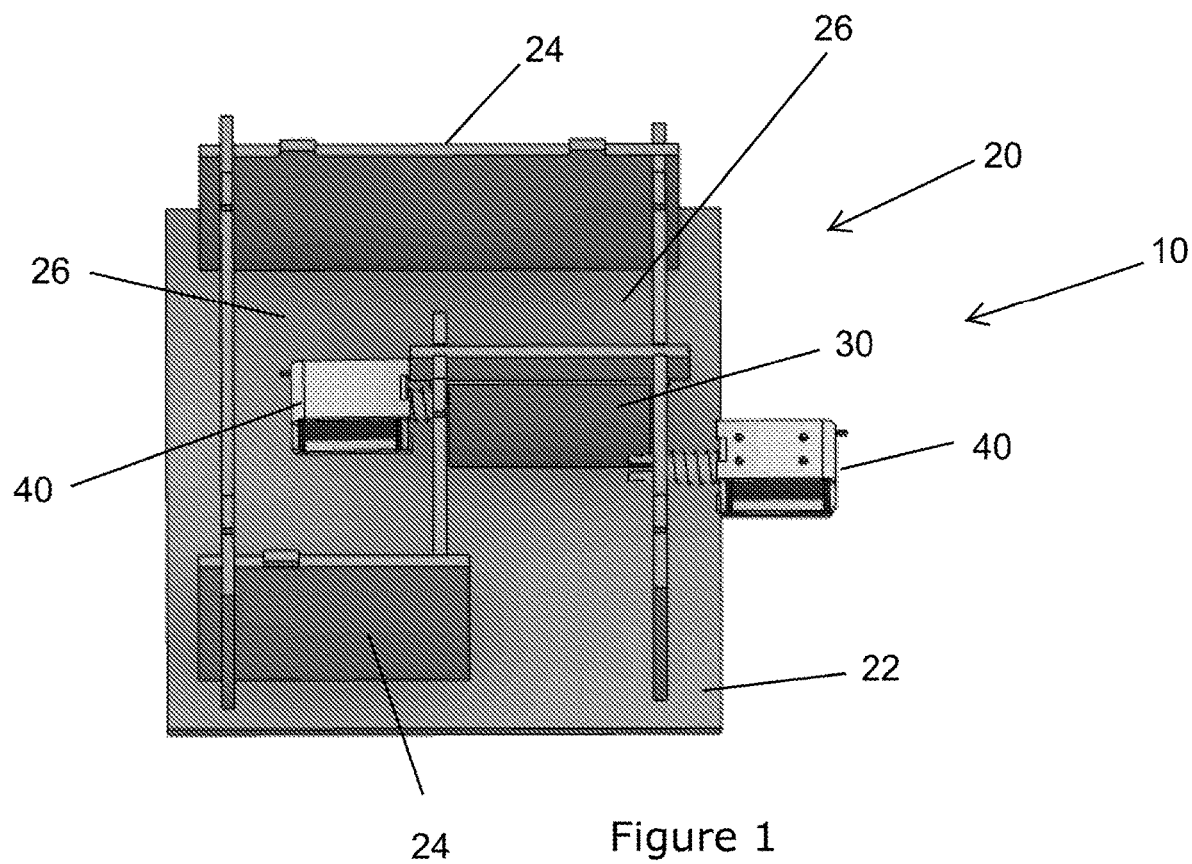
FIG. 1 is a perspective view of one embodiment of an organism container with a door in a closed configuration. Reference numbers shown include 10—organism container; 20— organism enclosure; 22—floor of organism enclosure; 24— walls of organism enclosure; 26— cavity defined by organism enclosure; 30— door into organism enclosure; 40— lock associated with door.
Figure 2:
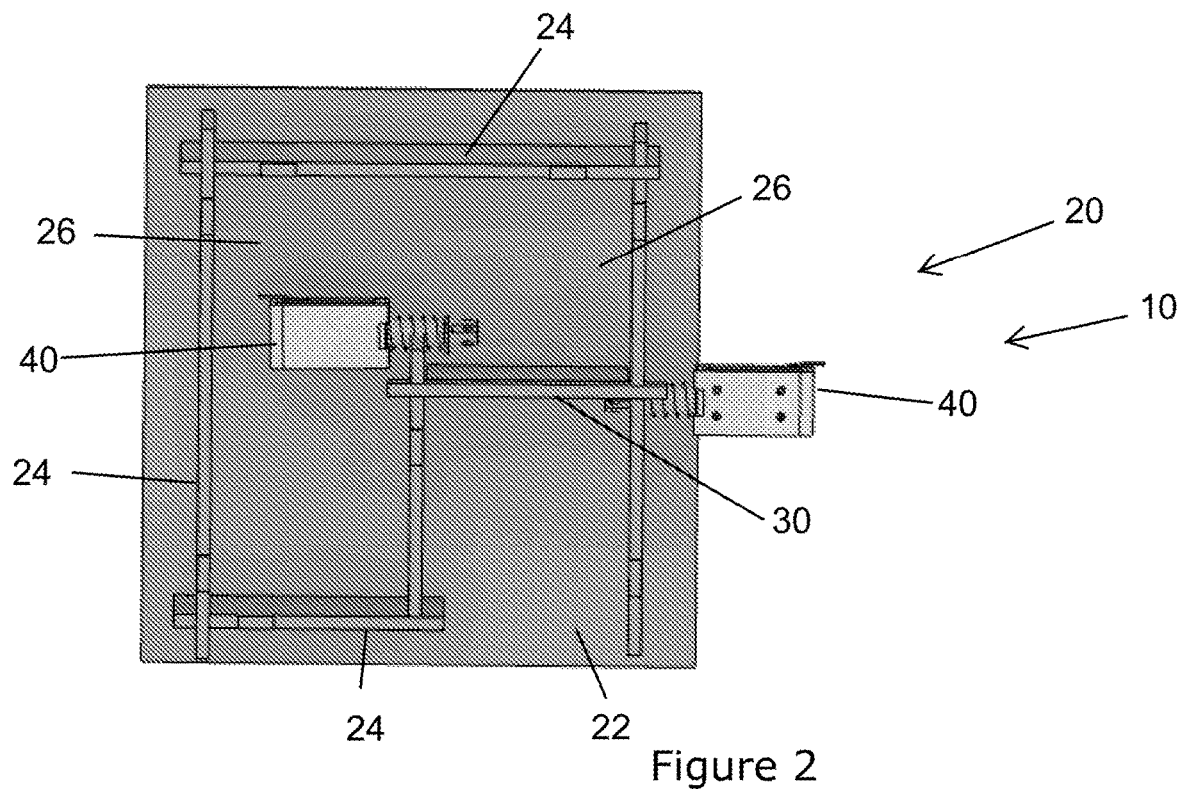
FIG. 2 is a top view of one embodiment of the organism container with the door in a closed configuration. Reference numbers shown include 10—organism container; 20— organism enclosure; 22—floor of organism enclosure; 24— walls of organism enclosure; 26— cavity defined by organism enclosure; 30— door into organism enclosure; 40— lock associated with door.
Figure 3:
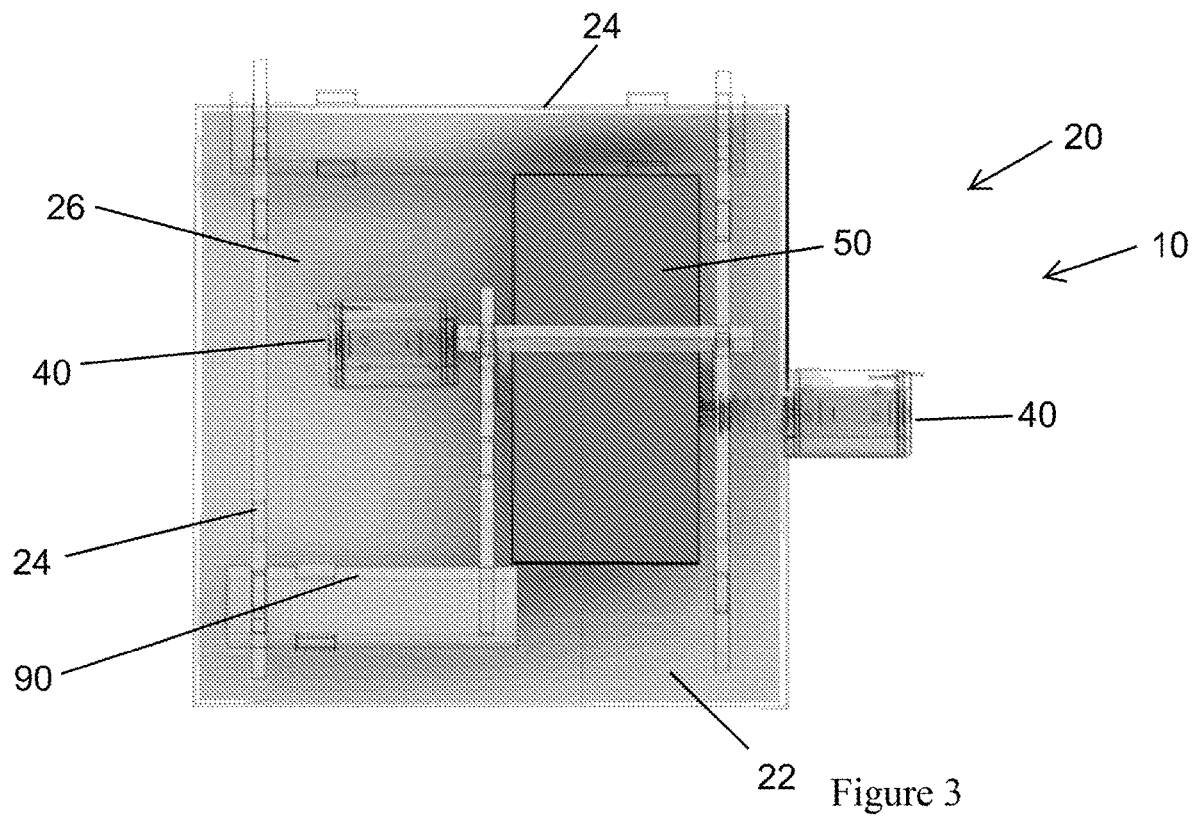
FIG. 3 is a top view of one embodiment of the organism container. Reference numbers shown include: 10— organism container; 20— organism enclosure; 22—floor of organism enclosure; 24— walls of organism enclosure; 26— cavity defined by organism enclosure; 40— lock associated with door; 50— panel or region above door in organism enclosure; 90— an internal partition in the organism container. In some embodiments of the invention (50) comprises a circuit board.
Figure 4:
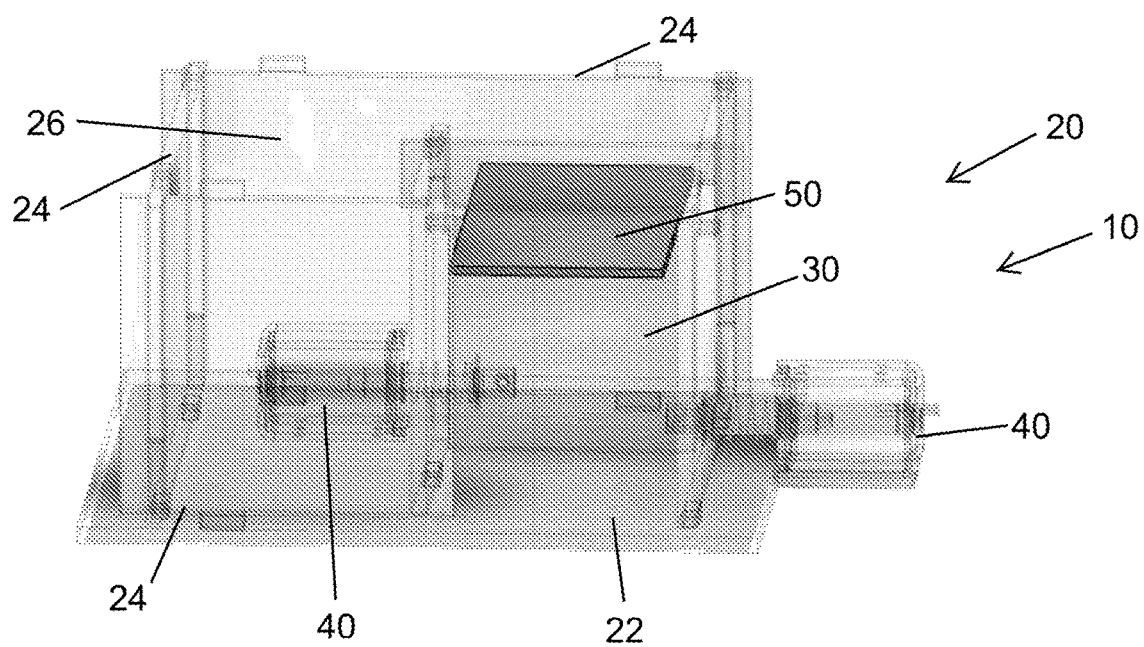
FIG. 4 is a front perspective view of one embodiment of the organism container with the door in a closed configuration. Reference numbers shown include: 10— organism container; 20— organism enclosure; 22—floor of organism enclosure; 24— walls of organism enclosure; 26— cavity defined by organism enclosure; 30— door into organism enclosure; 40— lock associated with door; 50— panel or region above door in organism enclosure. In some embodiments of the invention (50) comprises a circuit board.

Aspects of the invention, in part, include organism containers, systems, and methods of using such devices and systems for increasing likelihood of one or more of survival, fitness, and reproductive success of a preselected organism. In some embodiments, methods of the invention include providing an organism container in an environment in which a preselected organism is or will be present. In some instances, the environment into which the preselected organism is in or will be in, is an environment occupied by a target population of organisms of the same species as the preselected organism. Methods and devices of the invention permit efficient introduction of a preselected organism into a target population or organisms and provides an increased likelihood of survival of the preselected organism and/or offspring and descendants of the preselected organism in the target population. Use of devices, systems, and methods of the invention may improve a likelihood of survival and/or a likelihood of reproductive success for a preselected organism provided with an organism container of the invention, by at least: 1%, 2%, 3%, 4%, 5%, 6%, 7%, 8%, 9%, 10%, 15%, 20%, 25%, 30%, 35%, 40%, 45%, 50%, 55%, 60%, 65%, 70%, 75%, 80%, 85%, 90%, 100%, 150%, 200%, 500%, 1000%, or more, including all percentages in the range provided compared to the likelihood of survival and/or likelihood of reproductive success, respectively, for a preselected organism not provided an organism container of the invention.

The term "device" as used herein in conjunction with an organism container of the invention, which may include organism containers such as an organism nesting container, an organism provision container, etc. Certain embodiments of the invention comprise an organism container that is configured for use by a preselected organism. For example, some embodiments of the invention include a an organism nesting container configured in one or more of size, shape, external architecture, and internal architecture for use by a preselected organism. For example, a nesting container of the invention for use by a rodent, such as a mouse, may be configured in a manner optimal for use by a mouse as a nesting box. In another non-limiting example, a nesting container of the invention for use by a preselected bird is configured optimal for use by a bird of the species of the preselected bird.

An organism container of the invention may comprise additional items such as one or more of food, water, nesting material, medications, parasite deterrents, etc. The purpose for which an organism container of the invention is to be used can assist in determining the item(s) and/or amounts of items that are included in an organism container used in a system or method of the invention. For example, if an organism container of the invention is prepared for use by a preselected organism as a nesting container, sufficient food and water for the preselected organism and/or their offspring can be included. In a non-limiting example, delivery of a medication to a preselected organism is desirable to reduce risk of a disease or condition in the preselected organism, and a suitable amount of the medication is included in an organism container in a form in which it will be ingested or adsorbed by the preselected organism.

An organism container of the invention can be used to selectively provide an organism container and/or additional included items to a preselected organism. An embodiment of an organism container of the invention is configured in a manner to selectively identify a preselected organism and to respond with a pre-set action. As a non-limiting example, a nesting container with an openable entry (also referred to herein as a "door") is prepared. In some embodiments, a door is a swinging door. In some embodiments, a door swings from its top, and in some embodiments, it swings from one side. As used herein in context with a door, the term swing is used interchangeably with the word "pivot." The nesting container is configured to be capable of identifying a preselected organism. When an organism is outside of the nesting container and is positioned in a manner suitable for identification by the nesting container, if the nesting container identifies the organism as a preselected organism, the entry opens and permits the preselected organism to access the inside of the nesting container. Following entry by the preselected organism or if the preselected organism moves away from the nesting container, the nesting container identifies that the preselected organism is no longer positioned in a manner suitable for entry into the nesting container, and the entry closes. Thus, an organism container of the invention is configured to permit only a preselected organism to enter.

Similarly, certain embodiments of an organism container of the invention may be configured with a second sensor that detects when a preselected organism that is inside the organism container is positioned in a manner suitable to exit the container. In such embodiments, when a preselected organism in an organism container of the invention moves to a position in the closed organism container at which the second sensor identifies the preselected organism, the entry door opens and the preselected organism is able to exit the organism container.

Some embodiments of a device of the invention comprise an automated food and/or water dispenser. Such organism containers of the invention may be used in methods of organism training methods in which a desired behavior triggers a place-specific automated reward.

Devices, systems, and methods of the invention in some embodiments may include the ability to open and/or close the door of an organism container, using one or both of: a remote controlled element and a programmable element. In some embodiments of the invention, an organism container comprises a programmable element and/or a remote controlled element that can be used to open the container door. Such an organism container of the invention comprises a programmable element and/or a remotely controlled element capable of triggering opening of the door of the container, in the absence of a sensor identifying a preselected organism. As a non-limiting example, a programmable element is included in an organism container of the invention and a timed opening of the door is programmed into the element so that at a predetermined date, the container door is opened. Similarly, as a non-limiting example, a remotely controlled element is included in an organism container of the invention and an opening of the door results from a signal received by the element from the remote control and the container door is opened. With either a remotely controlled element or a programmable element, the opened door may remain open and may permit offspring of a preselected organism that are inside the organism container to depart from the organism container. A time programmed into the programmable element to open the door may be determined based on the gestational stage of a preselected pregnant organism that is released or is present with the organism container. For offspring born to a preselected organism that do not include the identification element of the preselected organism, this programmable element can be used to release the offspring from the organism container. In certain embodiments of the invention, an organism container is configured such that a preselected organism enters the container, and immediately or at a later time when the preselected organism is inside the container, a programmable element or a remotely controlled element capable of preventing opening of the container door even in circumstances in which the identification element of the preselected organism would normally open the door. For example though not intended to be limiting, it may be desirable to collect a preselected organism and/or offspring of the organism from an organism container.

Various identification means can be used in devices, systems, and methods of the invention. Non-limiting examples of identification technologies that can be used in certain embodiments of the invention are image comparison means, magnetic sensors and switches, RFID sensors and switches. Additional art-known identification means may be suitable for use in conjunction with devices, systems, and methods of the invention. Devices, systems, and methods of the invention comprise use of sensors positioned on and/or in an organism container of the invention and one or more identification elements included in or on a preselected organism for which the organism container is configured for use.

Identification means included in devices, systems, and methods of the invention can be used to selectively provide housing, food, water, and other items to a preselected organism, while restricting access to other organisms of the same or a different species than the preselected organism. In some embodiments of the invention, one or more of a first and a second magnetic sensor is included in an organism container and a magnet included on or in a preselected organism. In certain embodiments of the invention, one or more of a first and a second radio-frequency identification (RFID) sensor is included in an organism container and an RFID element (also referred to herein as an RFID chip) is included on or in a preselected organism. The terms "RFID element" and "RFID chip" as used herein mean an RFID identification element or device that is recognized by an RFID sensor.

In certain embodiments of the invention an identification element such as an RFID chip, a magnet, etc. may be implanted into the body of a preselected organism, and may be referred to as "in" and "internal to" the preselected organism. Such implants may be rendered biocompatible using methods known to those in the art; for example, a coating of Parylene can be applied. In certain embodiments, an identification element is external to a preselected organism. As used herein the term "on" when used in reference to an identification element such as an RFID chip, a magnet, etc. means the identification element is external to the preselected organism, but is attached directly or indirectly to the preselected organism. For example, an identification element may be included in an ear-tag that is attached to a preselected organism that is a rodent. In some embodiments, an identification element is attached directly to the preselected organism and in certain embodiments, an identification element may be indirectly attached to a preselected organism, for example, as part of a tag, on a harness, or other means that is on or attached to the preselected organism.

In some embodiments of the invention, an identification element is a physical characteristic of a preselected organism. As a non-limiting example, a preselected rodent or bird may have a detectable modification applied to the exterior of its body and an organism container of the invention that is prepared for the preselected rodent or bird, respectively, comprises as a first and/or second sensor, an imaging sensor capable of identifying the preselected organism based on the detectable modification. Non-limiting examples of detectable modifications that may be used as preselected organism identification elements in certain embodiments of systems and methods of the invention are a paint, a dye, a detectable marker, fur removal, ear punching, an ear docking, etc.

Organism Container

An organism container of the invention may be configured for a preselected organism. For example, its dimensions may be selected based on the type of organism, and the use for which the organism container is intended. For example, if the preselected organism is a mouse, the container cavity (26) may have an internal total volume that is less than 500 inches$^3$, 400 inches$^3$, 300 inches$^3$, 250 inches$^3$, 225 inches$^3$, 200 inches$^3$, 175 inches$^3$, or 150 inches$^3$, 125 inches$^3$, 100 inches$^3$, 75 inches$^3$, 50 inches$^3$, 25 inches$^3$, or 10 inches$^3$. In some embodiments of the invention, an organism container the volume of the container cavity is less than 100, 95, 90, 85, 80, 75, 70, 65, 60, 55, 50, 45, 40, 35, 30, 25, 24, 23, 22, 21, 20, 19, 18, 17, 16, 15, 14, 13, 12, 11, 10, 9, 8, 7, 6, 5, 4, 3, 2, times (including all numbers within the range provided) the volume of the preselected organism for which the organism container is used in a system and/or method of the invention. In some embodiments of the invention, the container cavity may include one or more partitions that divide the volume of the cavity into sections, which may be in communication with one or more other of the sections that that may contain food, bedding material, water, or other items provided in the organism container.

In certain embodiments of the invention, overall external dimensions of an organism container of the invention and the container cavity volume may be independent of each other. As a non-limiting example, external walls, floor, and a roof are present and internal walls, floor and a roof are also present in an organism container of the invention. One or more of the walls, floor, and roof may be external and internal walls, floor, and roof, and one or more may be different with physical space between. In some embodiments, a physical space is present between one or more of an interior and exterior wall, floor, and/or roof and in certain embodiments, materials such, but not limited to an insulating material may be present in the physical space.

One or more outside dimensions of an organism container of the invention may be determined and selected based on factors such as the location in which the container is placed, the habits of organism of the preselected organism's species, the time of year, and features present in the environment in which the container is positioned. For example, though not intended to be limiting, for a preselected organism that is a ground-dwelling bird, the outside dimension and/or shape of an organism container of the invention may be different from the outside dimension and/or shape of the outside dimension if the preselected organism is a tree-dwelling bird. Similarly, an organism container of the invention may comprise a material selected based on one or more factors such as: an environment in which it will be positioned, a desire for waterproofing, a desire for soundproofing, a desired longevity of the container, a preference of the preselected organism, a desire to permit or prevent viewing of the inside of the container from the outside, a need to prevent damage from other organisms, etc. Those in the art will recognize that elements of an organism container of the invention may include one or more of wood, glass, metal, plastic, fiber, cloth, stone, concrete, or other suitable material. An organism container of the invention may comprise one, two, three, or more different materials.

An organism container of the invention may comprise external fittings or anchors that may be used to maintain the position of the organism container in the environment in which it is positioned. In some embodiments of the invention, an organism container may be attached to an external object, buried underground, buried under a layer of material, etc. It will be understood that the exterior design, color, and look of an organism container of the invention may be determined based at least in part on the habits and needs of a preselected organism and the environment into which the organism container will be used. In some embodiments, one or more walls of the organism container may be replaced by equivalent barriers that are components of the surrounding environment, e.g. a natural rock wall or an artificial brick wall.

Figure 5:
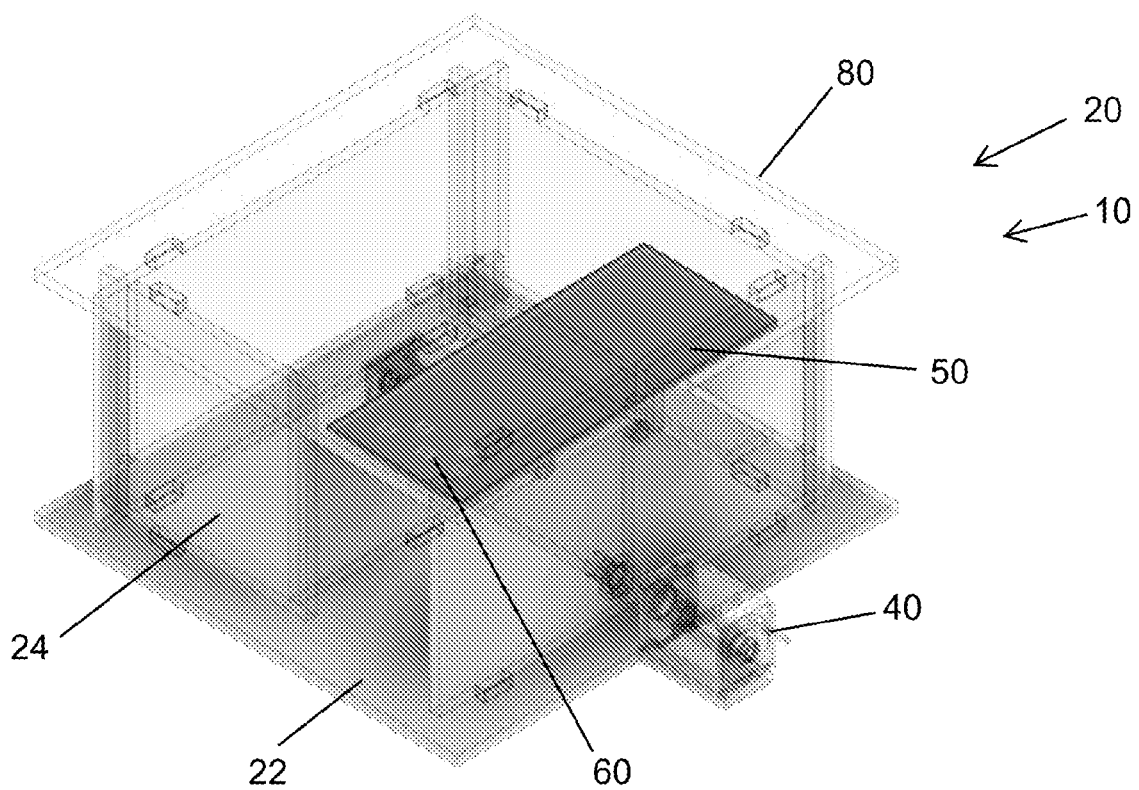
FIG. 5 is another perspective view of one embodiment of the organism container with the door in closed configuration. Reference numbers shown include: 10— organism container; 20— organism enclosure; 22—floor of organism enclosure; 24— walls of organism enclosure; 26— cavity defined by organism enclosure; 30— door into organism enclosure; 40— lock associated with door; 50— panel or region above door in organism enclosure; 60— sensor on panel or in region above door in organism enclosure; 80— roof of organism enclosure. In some embodiments of the invention (50) comprises a circuit board.
Figure 6:
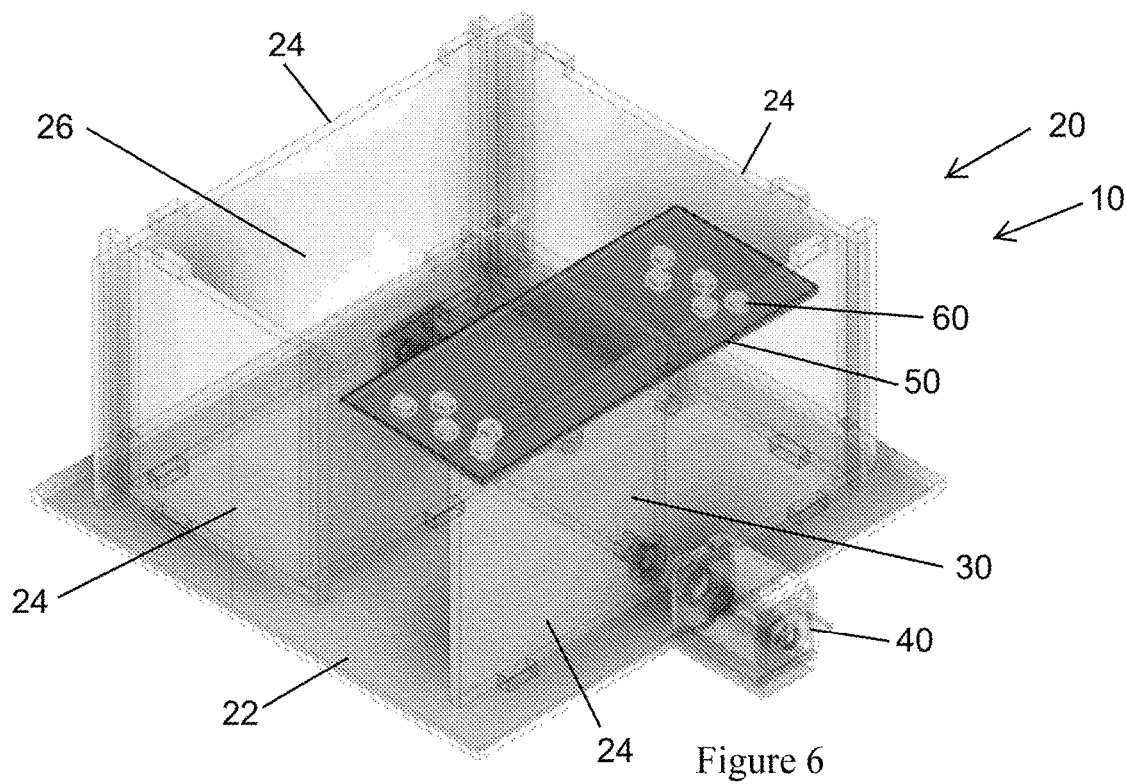
FIG. 6 is another perspective view of one embodiment of the organism container with the door in a closed configuration. Reference numbers shown include: 10—organism container; 20—organism enclosure; 22—floor of organism enclosure; 24—walls of organism enclosure; 26—cavity defined by organism enclosure; 30—door into organism enclosure; 40—lock associated with door; 50—panel or region above door in organism enclosure; 60—sensor on panel or in region above door in organism enclosure. In some embodiments of the invention (50) comprises a circuit board.
Figure 7:
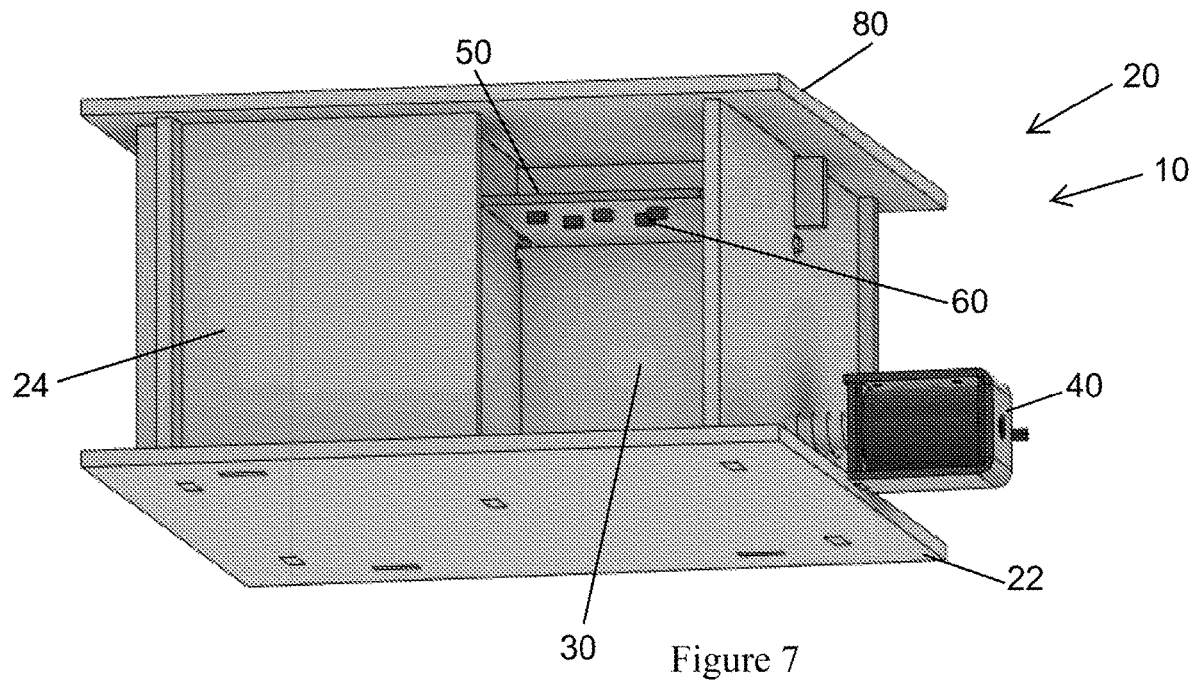
FIG. 7 is a front perspective view of one embodiment of the organism container with the door in a closed configuration. Reference numbers shown include 10—organism container; 20—organism enclosure; 22—floor of organism enclosure; 24—walls of organism enclosure; 30—door into organism enclosure; 40—lock associated with door; 50—panel or region above door in organism enclosure. In some embodiments of the invention (50) comprises a circuit board.

An embodiment of an organism container of the invention is schematically shown in FIG. 6 which illustrates: an organism container (10), an organism enclosure (20), an organism enclosure floor (22), organism enclosure walls (24), a cavity defined by organism enclosure (26), a door into the organism enclosure (30), a lock associated with the door (40), a panel, circuit board, surface, or region containing one or more sensor elements (50), 8 sensor element (60). It is contemplated that the shape, relative dimensions, and architecture of an organism container of the invention may differ in one or more ways from the embodiment shown in FIG. 6. For example, an organism container of the invention may have an overall shape that is round, rectangular, irregular, or other shape and can but need not be square as shown in the embodiment of FIGS. 1-7. Although not illustrated in FIGS. 1-4, an organism container of the invention generally includes a roof (80), a non-limiting example of which is shown in FIGS. 5 and 7. FIGS. 5-7 illustrate an embodiment of sensors positioned on a door of an organism container of the invention. It will be understood that other configurations of sensors can be also be used, including the same number of sensors shown or including more or fewer sensors. Sensors (first and second) can be positioned in an organism container of the invention in a configuration as shown in FIGS. 5-7 or in other configurations suitable to enable the sensors to perform as described herein.

One or more and/or configurations of sensors may be present in or on an organism container of the invention and such sensors are capable of selectively permitting entry into or exit from a preselected organism into the organism container. A sensor in an organism container of the invention is selected and positioned in and/or on the container so as to be capable of identifying a preselected organism so the container responds with a predetermined action. As a non-limiting example, an organism container of the invention comprising an openable and closable entry is configured to be capable of identifying a preselected organism. When a sensor of the organism container identifies a preselected organism outside of the container the entry opens, permitting entry of the preselected organism into the container cavity. Following entry by the preselected organism or if the preselected organism moves away from the container, the sensor no longer identifies the preselected organism positioned for entry into the nesting container, and the entry closes. When inside the container cavity, a sensor may be positioned in a manner that identifies the preselected organism in a position to exit the container and the identification results in the unlocking and/or opening of the entry, permitting the preselected organism to exit. When the preselected organism is no longer identified by one of the sensors in the organism container, the entry closes. In some embodiments, an organism container of the invention comprises one or more locks or similar devices that prevent opening of the entry into the container. A lock may be used in containers, systems, and methods of the invention to prevent entry by an organism other than a preselected organism. In certain embodiments of the invention, a lock may be included in an organism container and used to prevent a preselected organism from exiting the container.

Methods of Use

An embodiment of an organism container of the invention can be used to introduce or reintroduce a preselected organism into a geographic area of interest and/or or a population of interest. In certain embodiments of the invention, an organism container may be used to provide supplemental resources to a preselected organism that was introduced or reintroduced to a geographic area and/or population of interest at a prior time point. Embodiments of devices, systems, and methods of the invention can be used to increase the likelihood of survival of a preselected organism and/or to increase the likelihood of successful birthing and rearing of offspring by a preselected organism.

In certain embodiments of the invention, an organism container is used to introduce one or more preselected heritable trait(s) into a target population without adding, except by birth, engineered organisms into the target population. For example, though not intended to be limiting one or more of a preselected heritable phenotypic and/or genotypic trait is introduced into a population of organisms via "engineered" offspring that are born to a preselected host female organism that has been released into the population and provided an organism container of the invention capable of identifying the preselected organism. Non-limiting examples of types of preselected heritable traits that can be introduced into a target population using methods of the invention include: a trait that increases the population's robustness, a trait that increases likelihood of survival or an organism in the population, a trait that enhances a health characteristic of an organism in the population, a trait that increases resistance to disease of an organism in the population, etc. In some embodiments of the invention, heritable traits that may have a negative impact on a target population may be introduced and examples of types of such traits included, but are not limited to: a trait that decreases the population's robustness, a trait that decreases likelihood of survival of an organism in the population, a trait that negatively impacts a health characteristic of an organism in the population, a trait that decreases resistance to disease of an organism in the population, a trait that distorts the sex ratio of the organism, a trait that negatively impacts reproduction of the organism, etc. A non-limiting example of a target population to which negatively impacting heritable traits may be added are malaria-carrying mosquitos, ticks, screwworm flies, pigeons, rodents, cats, pigs, etc.

Methods and systems of the invention can be used to provide an organism container that identifies a preselected organism and is capable of providing safety, nutrition, water, nesting materials, etc. for the preselected organism. Only the preselected organism is able to access the space and provisions of the organism container, which increases the likelihood of survival and/or reproductive success of the preselected organism. Certain embodiments of a system or method of the invention can be used to introduce one or more preselected heritable traits into a population of the organisms. As used herein, the phrase "preselected heritable traits" may be used interchangeably with the phrase "preselected heritable phenotypic trait and/or preselected heritable genotypic trait" or the phrase "preselected heritable phenotypic and/or genotypic trait."

As used herein the term "genetic characteristic" used in reference to an organism or species means an inherited trait, for example, trait that is inherited by an offspring or descendant from the organism's parent or an ancestor, respectively. A genetic characteristic introduced into a population of organisms can be a heritable trait that is introduced into one or more organism in the population. Non-limiting examples of changes in a genetic characteristic introduced into an organism or population of organism may be inclusion of a sterile-female heritable trait, a coat-color heritable trait, a daughterless-male heritable trait, a disease-resistance trait, and the like. The phrase "genetic characteristic of a target population of organisms" may be used herein interchangeably with the phrase "heritable trait in the target population". Thus, certain methods of the invention comprising altering a genetic characteristic of a target population of organisms, comprise introducing one or more preselected heritable traits into one or more preselected organisms and providing an organism container of the invention for the one or more preselected organisms. In some embodiments, each preselected organism is provided an organism container that is configured to identify a first preselected organism and does not identify any other organism or a second or other preselected organism.

Embodiments of methods of the invention introduce into a population of organisms, one or more engineered organisms whose genomes comprise one or more genes or gene alleles that are responsible for a preselected heritable trait(s). Methods of the invention permit introduction in the population of the genes or gene alleles responsible for the preselected heritable trait(s), and thus are useful to bring new phenotypes into the population of organisms without adding new organisms with the phenotype into the population. In some embodiments of the invention, a preselected organism is an engineered organism that delivers a new heritable trait into a population is an organism comprising a gene-drive. In certain embodiments of the invention, a preselected organism released into the wild comprises a gene drive that results in the presence of the preselected heritable trait in the population. For example, though not intended to be limiting, one or more of a preselected heritable trait is introduced into a population of organisms via "engineered" offspring comprising a gene drive and that are born to a preselected host female organism that has been released into the population and provided an organism container of the invention configured to identify only that preselected host female organism. Certain embodiments of methods of the invention include providing one or more organism containers of the invention in conjunction with the introducing into a population of organisms, one or more preselected engineered organisms comprising a gene drive, wherein the presence of the gene-drive organisms in the population deliver one or more heritable traits in the population by birth, without adding new organisms with the phenotype of the heritable trait into the population.

Devices, systems, and methods of the invention can increase the likelihood of success of introducing into a population of the genes or gene alleles responsible for the preselected heritable trait(s) using gene-drive methods and organisms comprising a gene drive. Certain embodiments of the invention may be used to improve chances of successfully bringing one or more new phenotypes into a population of organisms without adding new organisms with the phenotype into the population. Use of devices, systems, and methods of the invention may improve a chance of success versus an introduction without use of a device, system, and method of the invention by at least: 1%, 2%, 3%, 4%, 5%, 6%, 7%, 8%, 9%, 10%, 15%, 20%, 25%, 30%, 35%, 40%, 45%, 50%, 55%, 60%, 65%, 70%, 75%, 80%, 85%, 90%, 100%, 150%, 200%, 500%, 1000%, or more, including all percentages in the range provided. Various methods to prepare and utilize a gene drive system, such as but not limited to a CRISPR-Cas9 system, to deliver one or more preselected heritable traits into an organism are known in the art, see for example, PCT Publication No.: PCT/US2017/031777, the contents of which is incorporated by referenced herein in its entirety. Gene-drive methods, including systems exhibiting underdominance and localized self-exhausting systems that lose their advantage after a number of generations, may be used in conjunction with certain embodiments of devices, systems, and methods of the invention to deliver one or more preselected heritable traits into an organism and/or a target population of organisms.

A population of organisms into which a device, system, and/or method of the invention can be used may be referred to herein as a "population of interest," which is also referred to herein as a "target population." An organism comprising one or more preselected heritable traits, such as an embryo, a fetus, an offspring, or a descendant of a host organism, may be referred to herein as an "engineered organism."

In some embodiments of the invention, an organism container may be used in a captive setting, for example in a laboratory setting, a commercial breeding setting, a pet store setting, a home (pet) setting, etc. For example, a preselected organism may be a captive organism and is provided with an organism container of the invention in captivity. Thus, devices, systems, and methods of the invention may be used with laboratory organisms or other captive organisms, such as laboratory mice, etc. and can provide a preselected organism access to a nesting container, nutrients, controlled resources, protection from other organisms, etc. in a captive setting.

Target Populations and Preselected Organisms

Certain aspects of the invention include methods for efficiently preparing in captivity one or multiple preselected organism to which an organism container of the invention is provided. In some embodiments, a preselected organism is an impregnated female organism of a species. In certain embodiments, a preselected organism is an impregnated captive female organism of a species. In certain embodiments, a preselected organism is a captured wild female organism of a species impregnated by a captive male or by artificial insemination. In some embodiments of the invention a preselected organism is prepared that includes one or more of a gene and gene allele that as a result, is included in the genome of offspring of the preselected organism.

An organism selected to be prepared as a host organism for use in methods of the invention may be selected, at least in part, because the organism has the same genetics as organism in a target population. In certain embodiments of the invention, an organism selected to be prepared as a preselected organism and provided with an organism container of the invention is selected because it has been a member of the target population and thus may have one or more of: knowledge of the local environment and social ties to other organisms in the population of organisms. Possession by a preselected organism of one or both of these features may enhance the preselected organism's ability to reproduce relative to a preselected organism that has not been a member of the population of interest. In some embodiments of the invention a host organism has not been a member of the target population and is an organism that is: naïve to the target population; transplanted into the target population from a different geographical area (even if of identical genetics); and/or transplanted in from a population of organisms that has had no contact with the target population (even if of identical genetics), etc.

Certain embodiments of the invention include obtaining an organism with the same genetics as organisms in a target population, and preparing the obtained organism as a preselected organism and releasing the preselected organism into a desired environment and/or population and providing an organism container of the invention for the preselected organism. Methods of the invention include preparing a preselected organism that is impregnated and into which one or more genetic elements have been introduced, releasing the preselected organism, and providing the preselected organism with an organism container of the invention. In certain embodiments of the invention, a prepared preselected organism comprises an identification element either internal or external to the preselected organism. The identification element, as described elsewhere herein, is recognized by one or more sensors of the organism container.

As used herein, the term "target population" is the population of organisms into which a preselected organism such as a preselected impregnated female organism, or in some instances a preselected engineered male organism, is released. Non-limiting examples of target populations include a wild population of the organism, an agricultural population of the organism, a human-managed population of the organism, a population of the organisms in a preserve, a population of the organisms in captivity; a zoo population of the organisms. In some embodiments of the invention, a target population is an endangered population of organisms. It will be understood that in some embodiments of the invention a target population is the population from which the female organism was captured and in some embodiments of the invention the target population is a population of the same species of organism as the captured female, but it is a different population than the one from which the female organism was captured.

It will be understood that in some embodiments of the invention a target population is the population from which the preselected impregnated female organism was obtained prior to the impregnation, and in some embodiments of the invention the target population is a population of the same species of organism as the preselected impregnated female, but is a different population than one from which the female organism was obtained.

Numbers, geographic distribution, and other characteristics of a target population into which one or more preselected organisms of the invention are included. Population numbers can be determined and changes assessed over time. Data on the efficacy of a release of one or a plurality of preselected engineered males or preselected impregnated females using an embodiment of a device, system and/or method of the invention can be collected and assessed. Such an assessment can be used to aid in determining a number of preselected organisms to be released at one or more subsequent time points.

Release

In some aspects of the invention, one or a plurality of preselected organisms of a species are prepared and provided with an organism container as set forth in an embodiment of the invention such there is an increased likelihood of survival of offspring of the preselected impregnated captive female organism(s). A preselected organism may be released into a population of interest and give birth to offspring that exhibit a preselected heritable trait. One or more offspring of the released preselected organism may be impregnated by mating with a male organism in the population and the preselected heritable trait exhibited by offspring resulting from the mating. This process may occur 1, 2, 3, 4, 5, 6, 7, 8, 9, 10, or more times thereby producing organisms that are descendants of a host organism and exhibit the preselected heritable traits. By reproducing in the organism population, offspring and descendants of a host organism establish and/or spread the preselected heritable trait(s) in the population. One or more of (1) genotyping to detect the presence or absence of one or more genes in an organism and (2) detecting the presence or absence of a phenotypic trait in an organism may be used to identify new male carriers of preselected heritable trait(s) of interest, and these male carriers can be used (non-limiting examples of which are for mating and to obtain genetic material of interest) to repeat the process of preparing a host organism.

In some embodiments of the invention one or a plurality of preselected impregnated captive female organisms are released into a population of the organisms and each provided with an organism container of the invention. In some instances, the preselected organism is released into a population of organisms prior to giving birth to her gestating offspring. A population of interest may be a population that is in the wild or may be a captive population of the organism. In some embodiments of the invention, a population of organisms is a population not in captivity. In some instances, a population of organisms is a controlled population, for example a captive, lab-maintained population of organisms. In other instances, a population of organisms is a wild population or is a domesticated population of organisms.

Multiple releases of preselected organisms into a population are contemplated in certain aspects of the invention. Some embodiments of the invention comprise 1, 2, 3, 4, 5, 6, 7, 8, 9, 10, or more releases of one or a plurality of preselected impregnated captive female organisms prepared using a method of the invention into a population of organisms of the species, wherein one or more, or each of the released preselected organism is provided an organism container of the invention. In some embodiments of the invention a plurality of preselected impregnated captive female organisms of a species are released into a population of organisms of the species at 1, 2, 3, 4, 5, 6, 7, 8, or more geographic locations, with an organism container provided for the one or more of each of the preselected organism in the geographic location of the release. In some embodiments of the invention, there are 1, 2, 3, 4, 5, 6, 7, 8, or more releases of one or a plurality of preselected impregnated captive female organisms of a species into a population of organisms of the species and the number of preselected impregnated captive female organisms in each release may be the same or the releases may include different numbers of preselected impregnated captive female organisms. For example, a first release may include 20 preselected impregnated captive female organisms and a subsequent release may include 50 preselected impregnated captive female organisms. In certain embodiments, an organism container of the invention is provided for one, some, or each of the preselected organisms. In certain embodiments of the invention factors such as: (1) the number of preselected impregnated captive female organisms released into a population, (2) the geographic release location(s), (3) the total number of preselected impregnated captive female organisms released into a population of the organisms, (4) the timing of one or more releases of one or more preselected impregnated captive female organisms into a population, and/or other release characteristics are determined based on factors including but not limited to: geographic area of the population, topography of the environment that includes the population, location of a device or devices of the invention, population size, geographic range of the population, behavior of organisms of the species, and density of the population of organisms.

Organism containers may contribute to multiple releases through re-use of the container or of the original pre-selected female organism or both. In a non-limiting example, organism containers with controlled-access doors may be programmed to close when the female is present within, then collected to repeat the process of insemination and release.

Detecting and Monitoring

Methods of the invention, in some embodiments, may include monitoring the efficacy of an organism container of the invention to improve the likelihood of survival and/or reproductive success of a preselected organism provided with the organism container. Certain embodiments of the invention include one or more of (1) determining the presence of one or more of a preselected organism in a population; (2) determining the presence of an introduced preselected phenotypic heritable traits in the population of interest at one or more time points and (3) determining in the population of interest one or more changes in the relative number of organisms that exhibit the introduced preselected heritable phenotypic trait compared to the number of organisms that do not exhibit the introduced preselected heritable phenotypic trait. In non-limiting examples, the presence of a preselected heritable trait may be monitored over time and a change in a relative number of organisms that exhibit the preselected heritable trait may be determined over time, etc. Some embodiments of methods of the invention include use of art-known methods to detect and determine actual and/or estimated numbers of organism in a captive population and/or a wild population of the organisms. Methods of the invention can be used to assess a population into which a preselected heritable trait has been introduced. A non-limiting example of a population characteristic that may be determined using a method of the invention is a ratio of the number of engineered organisms versus non-engineered organisms in a population following the introduction of a preselected heritable trait into a population of the organisms. Some embodiments of the invention include determining the presence or absence of a preselected phenotypic heritable trait in a population and/or determining a relative number of engineered organism and/or non-engineered organism in the total population. It will be understood that identifying an organism as an engineered organism produced using a method of the invention may comprise detecting that the organism exhibits a preselected heritable phenotypic trait. Similarly, a method of identifying an organism as an engineered organism produced using a method of the invention may comprise detecting that the organism's genetics comprises a preselected heritable genotypic trait. It will be understood that identifying an organism that exhibits a preselected heritable phenotypic trait also confirms that the organism carries the corresponding preselected heritable genotypic trait. Results obtained using detection and determination methods of the invention can be used to assess and/or identify the presence, absence, and/or spread of a heritable genotype trait (e.g., gene allele) responsible for an exhibited preselected heritable phenotypic trait and thus can be useful to assess the efficacy of providing an organism container to a preselected organism released into a population.

Organisms

Devices, systems, and methods of the invention may be used in conjunction with various types of organisms. Non-limiting examples of organisms to which a method of the invention of the invention may be implemented are insects, fish, reptiles, amphibians, mammals, rodents, and birds. In some embodiments of the invention an organism is a mammal, including but not limited to cats, dogs, pigs, pigeons, starlings, fish (e.g., carp, trout, etc.), ferrets, weasels, stoats, possums, mongooses, mice, squirrels, rats, chipmunks, moles, voles, etc. In certain embodiments of the invention, an organism is a marsupial, such as an opossum. In certain embodiments of the invention, an organism is not a human organism.

In some embodiments of methods of the intention, an organism is a rat, and optionally is a rat of the genus *Rattus*. In certain embodiments of methods of the invention, an organism is a mouse, and optionally is a mouse of the genus Mus or the genus *Peromyscus*. In some embodiments of the invention, an organism is a white-footed mouse (*P. Leucopus*). In some embodiments of the invention, an organism is of the species *Sus*. In certain embodiments of the invention, an organism is of the order: Rodentia. An organisms that may be used in methods of the invention, for example though not intended to be limiting: as a host organism or as a mate for a host organism, include but are not limited to: a captive organism raised in captivity, a captive organism obtained from a wild population of organism of the species, a domesticated organism, a wild organism, a domesticated animal, an agricultural animal, a zoo animal, and a wild animal. Embodiments of methods and compositions of the invention can be used in endangered organisms in which the introduction of new genetics are beneficial to species survival. In some aspects of the invention, methods are provided that can be used in an endangered organism of a species in which one or more preselected genetic traits must be introduced to the species of organism to result in, or to aid in, survival of the species.

In some aspects of the invention, an organism is selected and a preselected organism prepared because the organism is part of a population of organisms of interest to assess and study. A population of organisms may be of interest to study at least in part because of factors associated with the population, such as but not limited to: population size, geographic limitations of the population, geographic location of the population, environmental pressures on the population, status of the population as endangered, etc. In a non-limiting example, a population of organisms of interest may be a population of mice that is geographically isolated from other mouse populations. Embodiments of methods of the invention may comprise one or more of (1) releasing one or a plurality of host organisms into a population of the organism of interest and (2) releasing a plurality of offspring of one or a plurality of preselected organisms into a population of the organism of interest. A population of organisms of interest may be a local population, non-limiting examples of which include: a population in a geographically defined region, such as a forest, swamp, field, pond, island, building, etc. and a population in a politically defined region, such as a town, state, county, etc. In certain aspects of the invention, an organism species in which certain embodiments of methods of the invention may be implemented is an organism species that serves as a vector for disease affecting humans, animals, or plants. The term "vector" as used herein in reference to disease transfer, means an organism that carries and transmits an infectious pathogen into another living organism.

It will be understood that methods and compositions of the invention can be used alone or used in any combination of: before, simultaneously with, and after use of one or more alternative methods to assess, monitor, modify, and/or modulate a population of interest. In addition, methods of the invention, in some embodiments, may include introducing into a population of organism two or more preselected heritable phenotypic and/or genotypic traits.

The following examples are provided to illustrate specific instances of the practice of the present invention and are not intended to limit the scope of the invention. As will be apparent to one of ordinary skill in the art, the present invention will find application in a variety of compositions and methods.

EXAMPLES

Example 1

Introduction

An organism container as described elsewhere herein is prepared. In certain studies, a container comprises one or more features show in one or more of FIGS. 1-7. The organism container is capable of identifying a preselected organism and opening and closing an entry as described elsewhere herein. The prepared organism container is provided to the preselected organism. The preselected organism is identified by the organism container and the preselected organism enters and exits the organism container, 1, 2, 3, 4, 5, 6, 7, 8, 9, 10, or more times.

In some studies, the organism container comprises food, water, and nesting materials selected for the preselected organism. The preselected organism enters the organism container and utilizes one or of the container cavity, food, water, shelter provided by the organism container.

In some studies, the preselected organism comprises and/or is attached to an identification element, such as a magnetic element, radio-frequency identification (RFID) element, or a physical characteristic element such as color, and proximity of the identification element to a sensor in or on the container releases a door of the container and permits entry and exit of the organism into and out of the container, respectively.

Results

Use of the organism container by the preselected organism increases the likelihood of survival and reproductive fitness of the preselected organism.

Example 2

An organism container as described elsewhere herein is prepared. In certain studies, a container comprises one or more features show in one or more of FIGS. 1-7. The organism container is capable of identifying a preselected organism and opening and closing an entry as described elsewhere herein. The prepared organism container is provided to the preselected organism. The preselected organism is identified by the organism container and the preselected organism enters and exits the organism container, 1, 2, 3, 4, 5, 6, 7, 8, 9, 10, or more times.

The organism container comprises food, water, and nesting materials selected for the preselected organism. The preselected organism is pregnant.

The preselected pregnant organism enters the organism container and utilizes one or more of the container cavity, food, water, and shelter provide by the organism container and gives birth to live offspring.

In some studies, the preselected pregnant organism comprises and/or is attached to an identification element, such as a magnetic element, radio-frequency identification (RFID) element, or a physical characteristic element such as color, and proximity of the identification element to a sensor in or on the container releases a door of the container and permits entry and exit of the organism into and out of the container, respectively.

Results

The organism container increases the likelihood of survival and reproductive fitness of the preselected organism and increases the likelihood of survival and reproductive fitness of the offspring and descendants of the preselected pregnant organism.

Example 3

An organism container as described elsewhere herein is prepared. In certain studies, a container comprises one or more features show in one or more of FIGS. 1-7. The organism container is capable of identifying a preselected organism and opening and closing an entry as described elsewhere herein. The prepared organism container is provided to the preselected organism. The preselected organism is identified by the organism container and the preselected organism enters and exits the organism container, 1, 2, 3, 4, 5, 6, 7, 8, 9, 10, or more times.

The organism container comprises food, water, and nesting materials selected for the preselected organism. The preselected organism is pregnant and has been impregnated in a manner by which offspring of the preselected pregnant organism are engineered organisms.

The preselected pregnant organism enters the organism container and utilizes one or more of the container cavity, food, water, and shelter provide by the organism container and gives birth to live offspring, one or more of which are engineered organisms.

In some studies, the preselected organism comprises and/or is attached to an identification element, such as a magnetic element, radio-frequency identification (RFID) element, or a physical characteristic element such as color, and proximity of the identification element to a sensor in or on the container releases a door of the container and permits entry and exit of the organism into and out of the container, respectively.

Results

The organism container increases the likelihood of survival and reproductive fitness of the preselected organism and increases the likelihood of survival and reproductive fitness of the offspring and descendants of the preselected pregnant organism. The organism container increases the likelihood of the survival of one or more of the engineered organisms.

EQUIVALENTS

Although several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto; the invention may be practiced otherwise than as specifically described and claimed. The present invention is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

All definitions, as defined and used herein, should be understood to control over dictionary definitions, definitions in documents incorporated by reference, and/or ordinary meanings of the defined terms. The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified, unless clearly indicated to the contrary.

All references, patents and patent applications and publications that are cited or referred to in this application are incorporated herein in their entirety herein by reference.

What is claimed:

1. An organism container configured for permitting access to a preselected organism and denying access to other organisms, the organism container comprising:
   an organism enclosure which includes a floor, and one or more walls, which together define a container cavity configured to hold one or more of the organism;
   a door configured for selective access of one or more of the preselected organisms into the container cavity, wherein the door has an open configuration configured to permit entry of one or more of the preselected organism into the container cavity, and a closed configuration configured to deny entry of other of the organisms into the container cavity;
   a lock associated with the door, wherein the lock is configured to keep the door in the closed configuration;
   a first sensor associated with the organism enclosure, wherein the first sensor is configured to unlock the lock to selectively move the door into the open configuration when the first sensor detects the presence of the preselected organism at the door and outside of the organism enclosure so the preselected organism can enter the container cavity, and wherein the first sensor is configured to prevent access to the container cavity to other organisms;
   a second sensor associated with the organism enclosure, wherein the second sensor is configured to unlock the lock to selectively move the door into the open configuration when the second sensor detects the presence of the preselected organism at the door and inside of the organism enclosure so that the preselected organism can exit the container cavity; and
   a panel positioned above the door, wherein the first sensor is positioned on a first end of the panel, and the second sensor is positioned on a second end of the panel.

2. The organism container of claim 1, wherein the first sensor is a magnetic sensor.

3. The organism container of claim 1, wherein the first sensor is an RFID sensor.

4. The organism container of claim 1, wherein the door is configured to move back into the closed configuration after the presence of the preselected organism at the door is not detected at the first sensor for at least approximately 5, 10, 15, 20, 25, or 30 seconds.

5. The organism container of claim 1, in combination with an identification element configured to be in or on a preselected organism, wherein the identification element is configured to interact with the first sensor and the second sensor to detect the presence of the preselected organism.

6. The organism container of claim 1, wherein the preselected organism is a rodent, and optionally is pregnant.

7. The organism container of claim 1, wherein the preselected organism is a genetically engineered organism.

8. The organism container of claim 1, in combination with an identification element configured to be in or on the preselected organism, wherein the identification element is configured to interact with the first sensor to detect the presence of the preselected organism, and optionally, wherein the container further comprises one or more of a remotely controlled element and a programmable element capable of opening or closing the organism container door independent of the presence of the identification element of the preselected organism.

9. A system configured for introducing a preselected organism into a habitat and denying access to the system to other organisms, the system comprising:
   an organism container, the container comprising:
      an organism enclosure which includes a floor, and one or more walls which together define a container cavity configured to hold one or more of a preselected organism;
      a door configured for selective access of one or more of the organisms into the container cavity, wherein the door has an open configuration configured to permit entry of one or more organisms into the container cavity, and a closed configuration configured to deny entry of other organisms into the container cavity;
      a lock associated with the door, wherein the lock is configured to keep the door in the closed configuration;
      a first sensor associated with the organism enclosure, wherein the first sensor is configured to unlock the lock to selectively move the door into the open configuration when the first sensor detects the presence of the preselected organism at the door and outside of the organism enclosure so that the preselected organism can enter the container cavity, and wherein the first sensor is configured to prevent access to the container cavity to other organisms;
      an identification element configured to be in or on the preselected organism, wherein the identification element is configured to interact with the first sensor to detect the presence of the preselected organism;
      a second sensor associated with the organism enclosure, wherein the second sensor is configured to unlock the lock to selectively move the door into the open configuration when the second sensor detects the presence of the preselected organism at the door and inside of the organism enclosure so that the preselected organism can exit the container cavity;
      wherein the identification element is configured to interact with the second sensor to detect the presence of the preselected organism; and
      a panel positioned above the door, wherein the first sensor is positioned on a first end of the panel, and the second sensor is positioned on a second end of the panel.

10. The system of claim 9, wherein the first sensor is a magnetic sensor.

11. The system of claim 9, wherein the organism container further comprises one or more of a remotely controlled element and a programmable element capable of opening or closing the organism container door independent of the presence of the identification element of the preselected organism.

12. The system of claim 9, wherein the habitat is a wild habitat, and optionally the wild habitat comprises a target population of organisms of the species of the preselected organism.

13. A method for introducing a preselected organism into a habitat and increasing likelihood of survival of the preselected organism, the method comprising:
   providing an organism enclosure which defines a container cavity configured to hold one or more of an organism, the organism enclosure having a door configured for selective access of one or more of the organisms into the container cavity, wherein the door has an open configuration configured to permit entry of one or more of a preselected organism into the container cavity, and a closed configuration configured to deny entry of other organisms into the container cavity;
   providing a first sensor on a first end of a panel positioned above the door, wherein the first sensor is configured to prevent access to the container cavity to other organisms;
   placing the organism enclosure and the preselected organisms into the habitat, wherein the habitat includes other organisms;
   moving the door into the open configuration when the first sensor detects the presence of the preselected organism at the door and outside of the organism enclosure so that the preselected organism can enter the container cavity, and other organisms cannot enter the container cavity;
   providing a second sensor on a second end of the panel positioned above the door; and
   moving the door into the open configuration when the second sensor detects the presence of the preselected organism at the door and inside of the organism enclosure so the preselected organism can exit the container cavity and, wherein the method further comprises moving the door into the closed configuration when the second sensor does not detect the presence of the preselected organism at the door; and locking the door in the closed configuration.

14. The method of claim 13, further comprising;
   moving the door into the closed configuration when the first sensor does not detect the presence of the preselected organism at the door; and
   locking the door in the closed configuration.

15. The method of claim 13, further comprising:
   providing the preselected organism with an identification element, wherein the identification element is configured to interact with the first sensor and the second sensor to detect the presence of the preselected organism.

16. The method of claim 13, wherein the preselected organism is an engineered organism, optionally the preselected organism is a rodent, and optionally the preselected organism is pregnant, and wherein the other organisms are non-engineered organisms.

17. The method of claim 13, wherein the habitat is a wild habitat, and optionally the wild habitat comprises a target population of organisms of the species of the preselected organism.

\* \* \* \* \*